United States Patent
Kim et al.

(10) Patent No.: US 8,988,383 B2
(45) Date of Patent: Mar. 24, 2015

(54) ELECTROSTATIC CAPACITIVE TYPE TOUCH SCREEN PANEL

(75) Inventors: Dongsup Kim, Seoul (KR); Sangnam Ku, Gyeongbuk (KR); Sohaeng Cho, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 591 days.

(21) Appl. No.: 13/243,477

(22) Filed: Sep. 23, 2011

(65) Prior Publication Data

US 2012/0081334 A1 Apr. 5, 2012

(30) Foreign Application Priority Data

Oct. 1, 2010 (KR) .......................... 10-2010-0096079

(51) Int. Cl.
*G06F 3/045* (2006.01)
*G06F 3/044* (2006.01)

(52) U.S. Cl.
CPC ...... *G06F 3/044* (2013.01); *G06F 2203/04111* (2013.01)
USPC .......................................... 345/174; 345/173

(58) Field of Classification Search
USPC .......................................................... 345/174
See application file for complete search history.

(56) References Cited

U.S. PATENT DOCUMENTS

| | | | |
|---|---|---|---|
| 2007/0002204 A1* | 1/2007 | Kim et al. | 349/54 |
| 2009/0262096 A1* | 10/2009 | Teramoto | 345/174 |
| 2009/0277695 A1* | 11/2009 | Liu et al. | 178/18.03 |
| 2010/0073319 A1* | 3/2010 | Lyon et al. | 345/174 |
| 2010/0123674 A1* | 5/2010 | Wu et al. | 345/173 |
| 2010/0182275 A1 | 7/2010 | Saitou | |
| 2011/0141037 A1* | 6/2011 | Hwang et al. | 345/173 |

FOREIGN PATENT DOCUMENTS

| | | |
|---|---|---|
| KR | 10-2009-0112332 A | 10/2009 |
| KR | 10-2009-0122586 A | 12/2009 |

* cited by examiner

*Primary Examiner* — Gerald Johnson
(74) *Attorney, Agent, or Firm* — Birch, Stewart, Kolasch & Birch, LLP (57) ABSTRACT

A touch screen panel according to an embodiment includes a substrate; a plurality of first electrode serials arranged in a first direction on the substrate, each of the first electrode serials including a plurality of first electrode patterns; a plurality of second electrode serials arranged in a second direction on the substrate and crossing over the plurality of first electrode serials; a plurality of insulation patterns formed between the first electrode serials and the second electrode serials at regions in which the first electrode serials crosses over the second electrode serials so that the first electrode serials are insulated from the second electrode serials; and a plurality of first connection patterns formed on the substrate to connect neighboring first electrode patterns to each other.

9 Claims, 8 Drawing Sheets

FIG. 1

RELATED ART

FIG. 2

RELATED ART

ELECTROSTATIC CAPACITIVE TYPE TOUCH SCREEN PANEL

This application claims the priority and the benefit of Korea Patent Application No. 10-2010-0096079 filed on Oct. 1, 2010, the entire contents of which is incorporated herein by reference as if fully set forth herein.

BACKGROUND

1. Field of the Invention

Embodiments of this invention relate to a capacitive type touch screen panel.

2. Discussion of the Related Art

Along with the development of the electronics industry, display devices, such as a liquid crystal display, an electroluminescent display, and a plasma display panel having a quick response speed, low power consumption, and an excellent color reproduction rate, have been in the spotlight. The display devices are used for various electronic products such as televisions, monitors for computers, notebook computers, mobile telephones, display units for refrigerators, personal digital assistants, automated teller machines, and the like. In general, the display device interfaces with various input devices such as a keyboard, a mouse, and a digitizer. However, when a separate input device such as a keyboard, a mouse, or digitizer is used, user's dissatisfaction increases because the user is required to know how to use the separate input device and the separate input device occupies space. Therefore, a convenient and simple input device that can reduce erroneous operation is needed. Also, there is a need for a touch screen panel in which a user can input information by directly contacting a screen with a finger or a pen.

Because the touch screen panel has a simple configuration, which minimizes erroneous operations, the user can perform an input action without using a separate input device, and can quickly and easily manipulate through contents displayed on a screen. Accordingly, the touch screen panel has been applied to various display devices.

Touch screen panels are classified into a resistive type, a capacitive type, an electromagnetic type according to a detection method of a touched portion. The resistive type touch screen panel determines a touched position by a voltage gradient according to a change of resistance in a state that a DC voltage is applied to metal electrodes formed on an upper plate or a lower plate. The capacitive type touch screen panel senses a touched position according to a difference in capacitance created in an upper or lower plate when the user physically contacts with a conductive film formed on the upper or lower plate. The electromagnetic type touch screen panel detects a touched portion by reading an LC value induced as an electromagnetic pen touches a conductive film.

Figure 1:
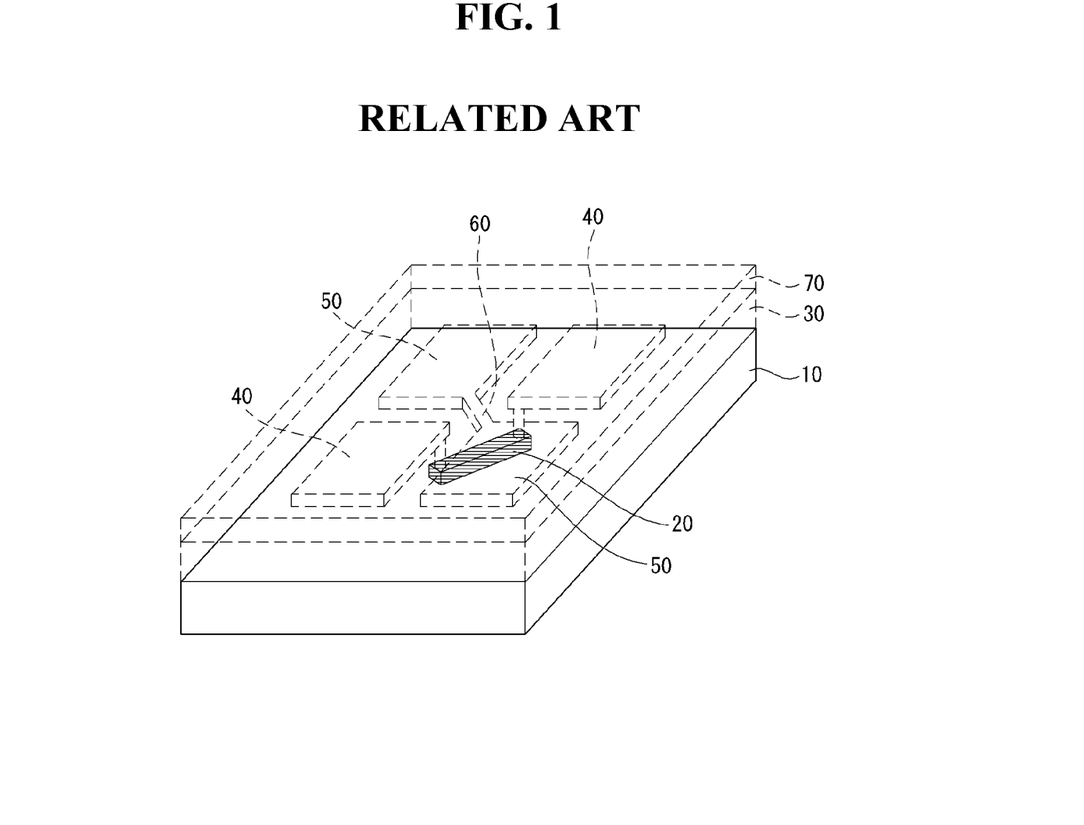
FIG. 1 is a perspective view illustrating a portion of a related art electrostatic capacitive type touch screen panel.

Hereinafter, a related art capacitive type touch screen panel will be described with reference to FIGS. 1 and 2. FIG. 1 is a perspective view illustrating a related art capacitive type touch screen panel, and FIG. 2 is a partial cross-sectional view illustrating a portion of the touch screen panel shown FIG. 1.

Figure 2:
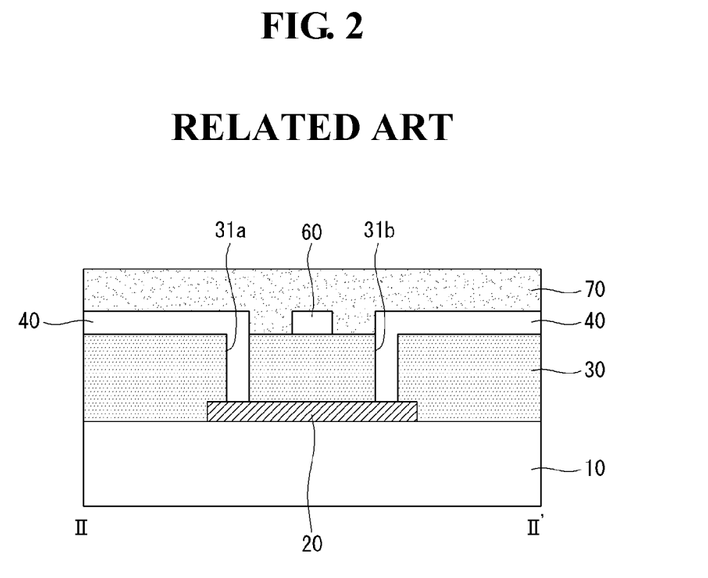
FIG. 2 is a cross-sectional view of illustrating a portion of the touch screen panel shown in FIG. 1.

Referring to FIGS. 1 and 2, the related art capacitive type touch screen panel includes a substrate 10, a first electrode serial and a second electrode serial. The first electrode serial has a plurality of first electrode patterns 40 and a plurality of first connection patterns 20 connecting neighboring first electrode patterns 40 to each other. The second electrode serial has a plurality of second electrode patterns 50 and a plurality of second connection patterns 60 connecting neighboring first electrode patterns 50 to each other. The first electrode serial is cross over the second electrode serial so that they are not contacted with each other.

The related art touch screen panel includes a first insulation layer 30 formed on an entire surface of the substrate on which the first connection patterns 20 are formed. The first insulation layer 30 has contact holes 31a and 31b to expose portions of each of the first connection pattern 20. Also, the related art touch screen panel includes a second insulation layer 70 as a protection layer. The second insulation layer 70 is formed on an entire surface of the first insulation layer 30 on which the first electrode pattern 40, the second electrode pattern 50 and the second connection pattern 60 are formed. The neighboring first electrode patterns 40 are connected with each other by the first connection pattern 20 through the first and second contact holes 31a and 32b of the first insulation layer 30.

In the related art touch screen panel, the first electrode patterns 40, the second electrode patterns 50 and the second connection patterns 60 are formed of a transparent conductive material such as ITO, the first connection patterns 20 are formed of a metal material, and the first and second insulation layer 30 and 70 are formed of silicon oxide, silicon nitride or organic resin material.

As thus, in the related art touch screen panel, the first insulation layer 30 has the contact holes 31a and 31b, and the neighboring first electrode patterns 40 are connected with each other by the first connection pattern 20 through the contact holes 31a and 31b.

In the related art touch screen panel, the contact holes 31a and 31b are formed in a very small size because the first and second electrode patterns 40 and 50 are formed a small size to improve a precision of touch perception. Also, the first connection pattern 20 and the first electrode pattern 40 connected to each other via the contact holes 31a and 31b are formed in different materials. Accordingly, the related art touch screen panel is very weak in static electricity, because the resistance of the first electrode pattern 40 filled in the contact holes 31a and 31b increases, and also the contact resistance of the first electrode pattern 40 and the first connection pattern 20 increases. The increase of the resistance of the first electrode pattern 40 filled in the contact holes 31a and 31b arises from decreasing the size of the contact holes 31a and 31b, and the increase of the contact resistance arises from forming the first connection pattern 20 and the first electrode pattern 40 in different materials.

In the related art touch screen panel, if a high current flows temporarily in the first electrode pattern 40 filled in the contact holes 31a and 31b by static electricity generated during a panel fabricating process, module fabricating process, or product transportation and so on, at least one of the contact holes 31a and 31b and the first connection pattern 20 may be damaged.

SUMMARY

An object of this invention is to provide a touch screen panel that can prevent the contact holes and the first connection pattern from being damaged.

Additional features and advantages of this invention will be set forth in the description which follows, and in part will be apparent from the description, or may be learned by practice of this invention. The objectives and other advantages of this invention will be realized and attained by the structure particularly pointed out in the written description and claims hereof as well as the appended drawings.

To achieve these and other advantages and in accordance with the purpose of this invention, as embodied and broadly described, a touch screen panel includes a substrate; a plurality of first electrode serials arranged in a first direction on the substrate, each of the first electrode serials including a plurality of first electrode patterns; a plurality of second electrode serials arranged in a second direction on the substrate and crossing over the plurality of first electrode serials; a plurality of insulation patterns formed between the first electrode serials and the second electrode serials at regions in which the first electrode serials crosses over the second electrode serials so that the first electrode serials are insulated from the second electrode serials; and a plurality of first connection patterns formed on the substrate to connect neighboring first electrode patterns to each other, wherein each of the plurality of first connection patterns includes a first portion overlapped with the second electrode serial, a second portion extended from one end of the first portion and overlapped with one of the neighboring first electrode patterns, and a third portion extended from another end of the first portion and overlapped with another of the neighboring first electrode patterns, and a width of at least one portion of the second and third portions of the first connection pattern is larger than that of the first portion.

In the touch screen panel, each of the second electrode serials includes a plurality of second electrode patterns and second connection patterns for connecting neighboring second electrode patterns, wherein each of the second connection patterns is integrally formed with the second electrode patterns.

In the touch screen panel, each of the plurality of first connection patterns includes one or two layers, if the first connection pattern includes the one layer, the one layer is formed of a transparent conductive material, and if the first connection pattern includes two layers, an upper layer of the two layers is formed of a transparent conductive material and a lower layer of the two layers is formed of a metal material.

In the touch screen panel, the first and second electrode patterns and the second connection pattern are formed of a transparent conductive material.

In the touch screen panel, the transparent conductive material includes one of indium tin oxide (ITO), indium zinc oxide (IZO) and Gallium-doped Zinc Oxide (GZO), and the metal material includes one of Al, AlNd, Mo, MoTi, Cu, CuOx and Cr.

In the touch screen panel, the width of the second connection pattern at the overlap area in which the first connection pattern is overlapped with the second connection pattern is smaller than that of the non-overlap area in which the first connection pattern is not overlapped with the second connection pattern.

In the touch screen panel, a width of the lower layer of the first connection pattern is not larger than that of the insulation pattern, and a width of the upper layer of the first connection pattern is larger than that of the insulation pattern to be exposed outside the insulation pattern.

In the touch screen panel, widths of the lower and upper layers and of the first connection pattern are larger than that of the insulation pattern to be exposed outside the insulation pattern.

In the touch screen panel, the first electrode pattern is formed on a portion of the second and third portions of the first connection pattern exposed outside of the insulation pattern, and an upper surface and side surfaces of insulation pattern.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention. In the drawings.

DETAILED DESCRIPTION

Embodiments of the invention are based on recognition that particular portions such as contact holes, electrode patterns and connection patterns of an electrostatic capacitive type touch screen panel are weak from static electricity.

Inventors have studied about damages of the touch screen panel by the static electricity, and suggest the following solutions as the result of study.

Firstly, it is possible to decrease the contact resistance of a first connection pattern and a first electrode pattern by largely setting a contact area the first connection pattern and the first electrode pattern. For this, an insulation layer between a first electrode serial and a second electrode serial is removed while remaining a cross area in which a first electrode serial including a plurality of first electrode patterns cross over a second electrode serial including a plurality of second electrode patterns. And then, an overlap area of the first connection pattern and the first electrode pattern are different from another overlap area of the first connection pattern and the second electrode serial. Herein, the first connection pattern connects neighbored first electrode patterns to each other. According to the mentioned above construction, the contact resistance of the first connection pattern and the first electrode pattern is decrease. Thus, it is possible to prevent the first connection pattern from being damaged, although high current flows temporarily in the first connection pattern through the first electrode pattern filled in the contact holes by static electricity generated during a panel fabricating process, module fabricating process, or product transportation and so on.

Secondly, it is possible to enhance a touch performance by making the width of the second electrode serial a narrow at the overlap area of the first connection pattern and the second electrode serial to decrease the overlap area of the first connection pattern and the second electrode serial. That is, it is possible enhance a touch performance of the touch screen panel because a parasitic capacitance generated by the overlap of the first electrode serial and the second electrode serial decreases when the overlap area of the first electrode serial and the second electrode serial decreases.

Hereinafter, exemplary embodiments of this invention will be described in detail with reference to FIG. 3 and FIG. 7C. Like reference numerals designate like elements throughout the specification.

Figure 3:
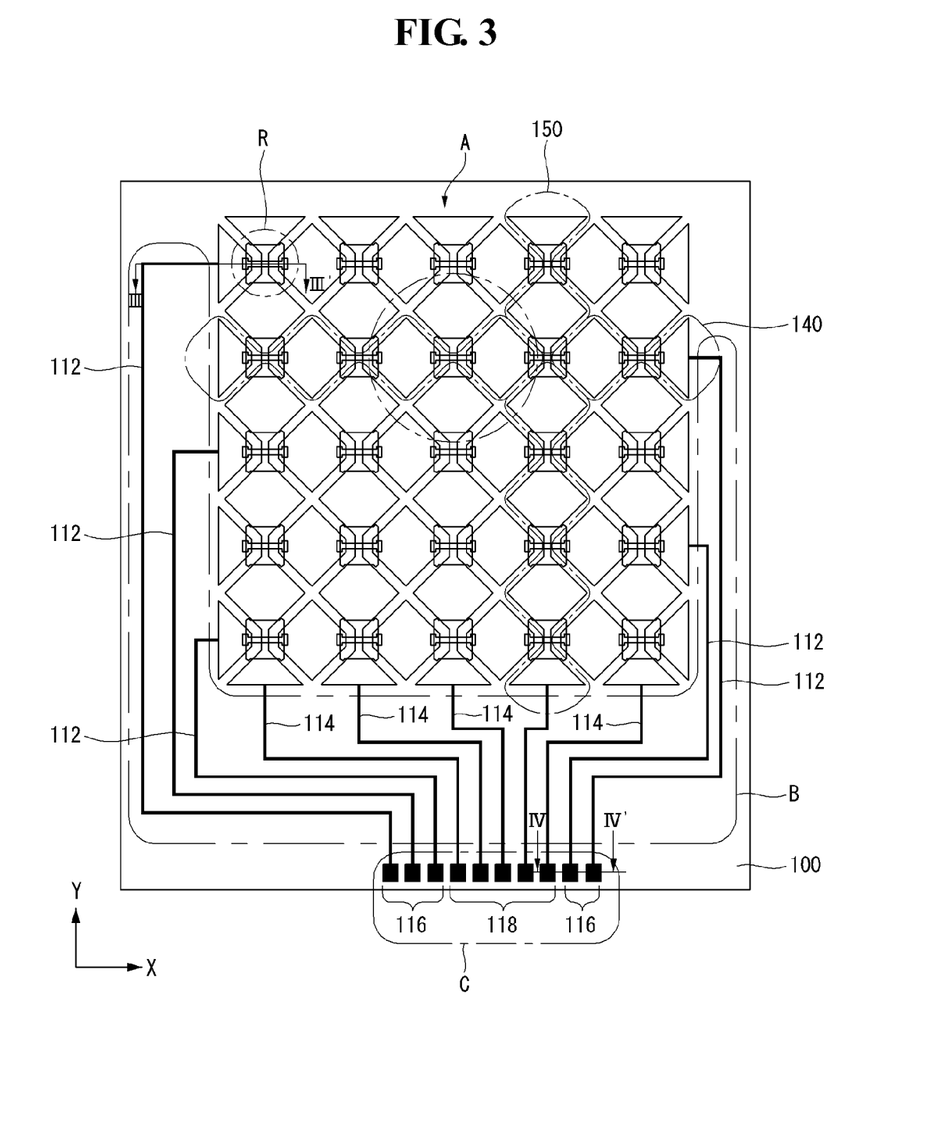
FIG. 3 is a plan view illustrating an electrostatic capacitive type touch screen panel according to an exemplary embodiment of this invention.
Figure 4:
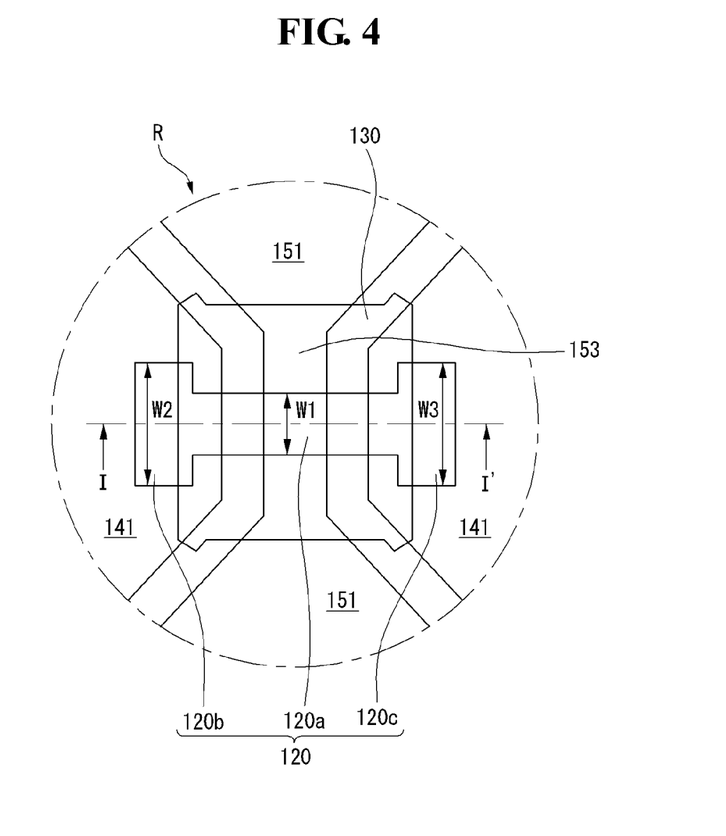
FIG. 4 is an enlarged plan view illustrating one example of R part of the touch screen panel shown in FIG. 3.
Figure 5A:
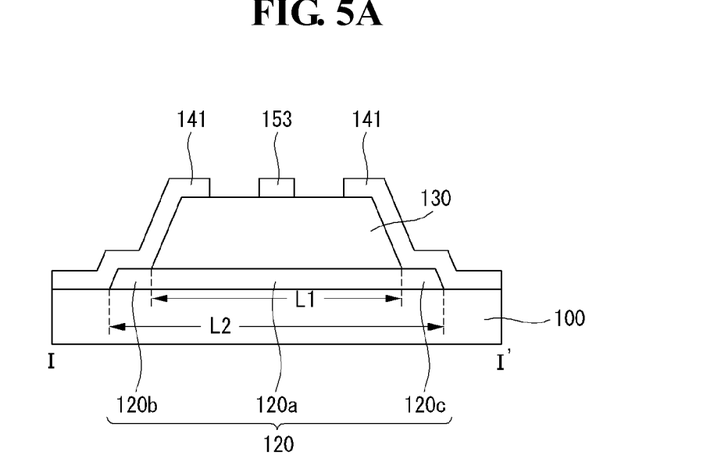
FIGS. 5A to 5C are cross-sectional views illustrating examples of the touch screen panel taken along line I-I' of FIG. 4.
Figure 5B:
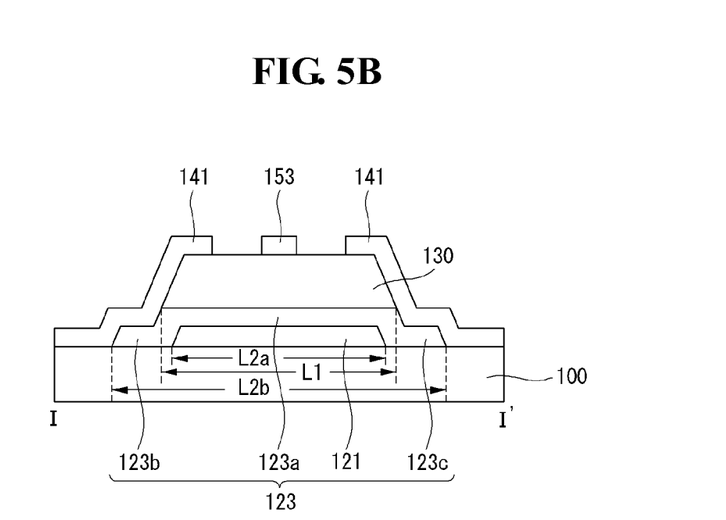
Figure 5C:
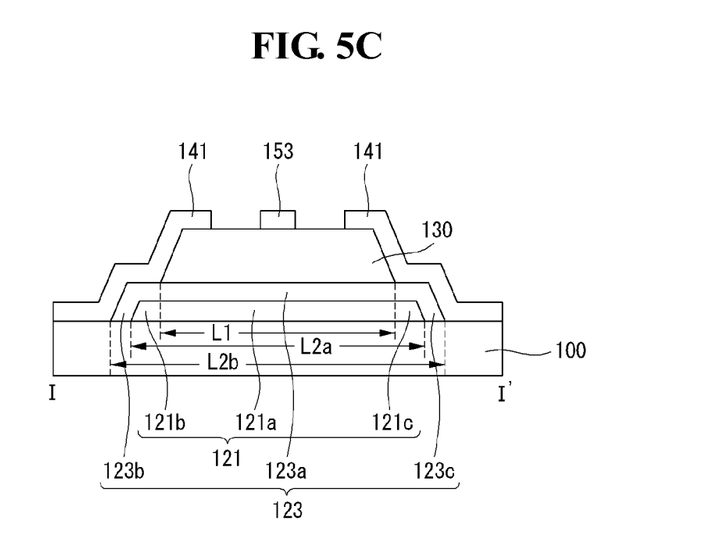

FIG. 3 is a plan view illustrating an electrostatic capacitive type touch screen panel according to an exemplary embodiment of this invention. FIG. 4 is an enlarged plan view illustrating one example of R part of the touch screen panel shown in FIG. 3. FIGS. 5A to 5C are cross-sectional views illustrating examples of the touch screen panel taken along line I-I' of FIG. 4.

Referring to FIGS. 3 and 4, the touch screen panel according to a first exemplary embodiment of this invention includes an electrode forming part A, a routing wire forming part B, and a pad forming part C.

The electrode forming part A includes a plurality of first electrode serials 140 optionally arranged in parallel in a first direction (for example, an X-axis direction) and a plurality of second electrode serial 150 optionally arranged in parallel in a second direction (for example, Y-axis direction) to cross over the first direction. The electrode forming part A also includes a plurality of insulation patterns 130 formed at cross region of the first and second electrode serials 140 and 150 to electrically insulate the first electrode serial 140 from the second electrode serial 150.

Each of the first electrode serials 140 includes first electrode patterns 141 having a triangle, a rectangle, a square, a quadrangle, a diamond shape, a polygonal shape, and the like, and a plurality of first connection patterns 120 for connecting neighboring first electrode patterns 141. Any suitable shape of the first electrode pattern 141 may be used.

Each of the second electrode serials 150 includes second electrode patterns 151 having a triangle, a rectangle, a square, a quadrangle, a diamond shape, a polygonal shape, which may be similar to the first electrode patterns 141 and second connection patterns 153 for connecting neighboring second electrode patterns 151. Any suitable shape of the second electrode pattern 151 may be used.

Each of the first connection patterns 120 is formed between the insulation layer 130 and the substrate 100 at cross region of the first electrode serial 140 and the second electrode serial 150 to connect neighboring first electrode patterns 141 to each other. On the other hand, each of the second connection patterns 153 is integrally formed with the second electrode patterns 151 and formed on the insulation patterns 130 at cross region of the first electrode serial 140 and the second electrode serial 150.

The routing wire forming part B is formed on the substrate 100 at positions outside the electrode forming part A, and includes a plurality of first routing wires 112 connected to the plurality of first electrode serials 140, respectively and a plurality of second routing wires 114 connected to the plurality of second electrode serials 150, respectively.

The pad forming part C includes a plurality of first pads 116 connected to the plurality of first electrode serials 140 through the plurality of first routing wires 112, respectively, and a plurality of second pads 118 connected to the plurality of second electrode serials 150 through the plurality of second routing wires 114, respectively.

Figure 8:
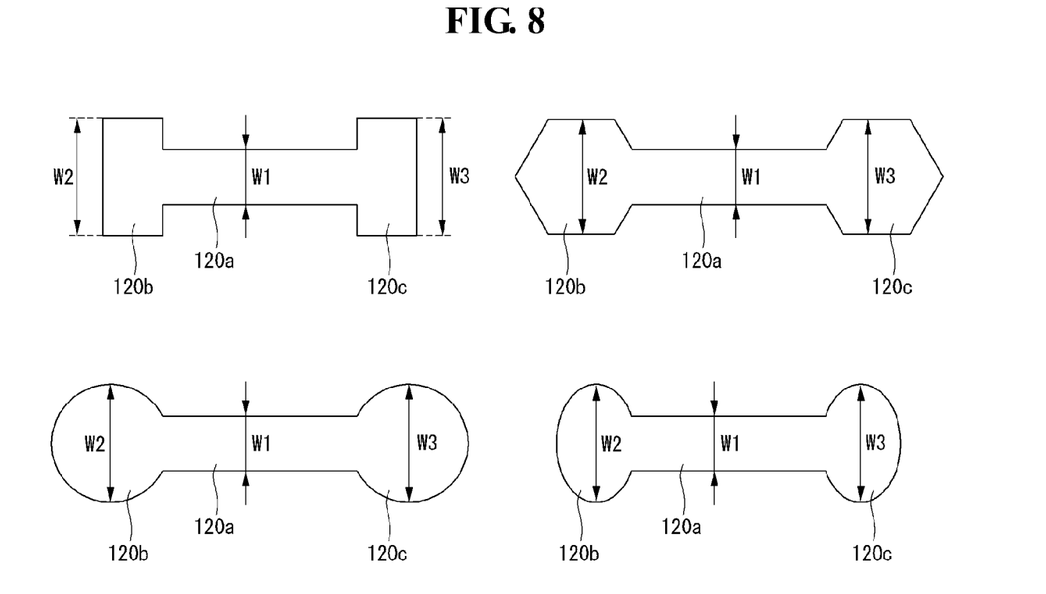
FIG. 8 shows plan views illustrating examples of a first connection pattern having first and second extension portions of various shapes.

Referring to FIGS. 3 and 4, the first connection pattern 120 has a middle portion 120a partially overlapped with the second connection pattern 153 and first and second extension portions 120b and 120c to connect neighboring first electrode patterns 141 to each other. The first extension portion 120b extends from the middle portion 120a to a left direction of FIG. 4, and has a width W2 larger than a width W1 of the middle portion 120a at an overlap area of the first electrode pattern 141 and the first connection pattern 120. The second extension portion 120c extends from the middle portion 120a to a right direction of FIG. 4, and has a width W3 larger than the width W1 of the middle portion 120a at an overlap area of the first electrode pattern 141 and the first connection pattern 120. FIG. 4 shows that the first and second extension portion 120b and 120c has rectangular shape, but this invention is not limited thereto. The construction in which the first and second extension portions 120b and 120c of the first connection portion 120 have the width W2 and W3 larger than the width W1 of the middle portion 120a belongs to scope of this invention. FIG. 8 shows the first connection pattern 120 having first second extension portions 120b and 120c of various shapes such as rectangular, polygonal shape, circular shape, or oval shape.

FIG. 4 shows that the insulation pattern 130 overlaps with the a portion of the first electrode pattern 141, a portion of the first connection pattern 120, a portion of the second electrode pattern 151 and the second connection pattern 153, but this invention is not limited thereto. For example, it is possible that the insulation pattern 130 is formed at only cross area of the first connection pattern 120 and the second connection pattern 153 so that the first connection pattern 120 is not contacted with the second electrode pattern 153.

FIGS. 5A to 5C are cross-sectional views illustrating examples of the touch screen panel taken along line I-I' of FIG. 4. FIG. 5A shows an example that the first connection pattern 120 is formed in a single layer, FIGS. 5B and 5C show another examples that the first connection 120 are formed in double layers having a lower layer 121 and an upper layer 123. FIG. 5B is different from FIG. 5C that the lower layer 121 is not exposed outside of the insulation pattern 130 in FIG. 5B but the lower layer 121 is exposed outside of the insulation pattern 130 in FIG. 5C.

Referring FIG. 5A, the first connection pattern 120 is formed on the substrate 100, and the insulation pattern 130 having a length L1 smaller than a length L2 of the first connection pattern 120 is formed on the first connection pattern 120. Also, the first electrode pattern 141 is formed on a portion of the substrate 100, a portion of the first and second extension portions 120b and 120c of the first connection pattern 120 to be exposed outside of the insulation pattern 130, and an upper surface and side surfaces of insulation pattern 130. The second connection pattern 153 is formed on the insulation pattern 130 between the first electrode patterns 141 so that the second connection pattern 153 is not contacted with the first electrode patterns 141.

In the example of FIG. 5A, the first connection pattern 120 is formed of a transparent conductive material such as indium tin oxide (ITO), indium zinc oxide (IZO) and Gallium-doped Zinc Oxide (GZO), or a metal material such as Al, AlNd, Mo, MoTi, Cu, CuOx and Cr. The first and second electrode patterns 141 and 151 and the second connection pattern 153 are formed of a transparent conductive material such as ITO, IZO and GZO.

Referring FIG. 5B, the first connection pattern 120 consisting of a lower layer 121 and an upper layer 123 is formed on the substrate 100, and the insulation pattern 130 is formed on the upper layer 123 of the first connection pattern 120. A length L2a of the lower layer 121 of the first connection pattern 120 is not larger than a length L1 of the insulation layer 130, and a length L2b of the upper layer 123 of the first connection pattern 120 is larger than a length L1 of the insulation layer 130 to be exposed outside the insulation layer 130. Also, the first electrode pattern 141 is formed on a portion of the substrate 100, a first extension portion 123b or a second extension portion 123c of the upper layer 123 of the first connection pattern 120 exposed outside of the insulation pattern 130, and an upper surface and side surfaces of insulation pattern 130. The second connection pattern 153 is formed on the insulation pattern 130 between the first electrode patterns 141 so that the second connection pattern 153 is not contacted with the first electrode patterns 141.

In the example of FIG. 5B, the lower layer 121 of the first connection pattern 120 is formed of a transparent conductive material such as indium tin oxide (ITO), indium zinc oxide (IZO) and Gallium-doped Zinc Oxide (GZO), or a metal material such as Al, AlNd, Mo, MoTi, Cu, CuOx and Cr. The upper layer 123 of the first connection pattern 120 is formed of the above-mentioned metal material when the lower pattern 121 is formed of the transparent conductive material, and formed of the above-mentioned transparent conductive material when the lower pattern 121 is formed of the above-mentioned metal material. The first and second electrode patterns 141 and 151 and the second connection pattern 153 are formed of a transparent conductive material such as ITO, IZO and GZO.

Referring FIG. 5C, the first connection pattern 120 consisting of a lower layer 121 and an upper layer 123 is formed on the substrate 100, and the insulation pattern 130 is formed on the upper layer 123 of the first connection pattern 120. Lengths L2a and L2b of the lower and upper layers 121 and 123 of the first connection pattern 120 are larger than length L1 of the insulation layer 130 to be exposed outside the insulation layer 130. Also, the first electrode pattern 141 is formed on a portion of the substrate 100, a first extension portion 123b or a second extension portion 123c of the upper layer 123 of the first connection pattern 120 exposed outside of the insulation pattern 130, and an upper surface and side surfaces of insulation pattern 130. The second connection pattern 153 is formed on the insulation pattern 130 between the first electrode patterns 141 so that the second connection pattern 153 is not contacted with the first electrode patterns 141.

In the example of FIG. 5C, the lower layer 121 of the first connection pattern 120 is formed of a transparent conductive material such as indium tin oxide (ITO), indium zinc oxide (IZO) and Gallium-doped Zinc Oxide (GZO), or a metal material such as Al, AlNd, Mo, MoTi, Cu, CuOx and Cr. The upper layer 123 of the first connection pattern 120 is formed of the above-mentioned metal material when the lower pattern 121 is formed of the transparent conductive material, and formed of the above-mentioned transparent conductive material when the lower pattern 121 is formed of the above-mentioned metal material. The first and second electrode patterns 141 and 151 and the second connection pattern 153 are formed of a transparent conductive material such as ITO, IZO and GZO.

In the examples of FIGS. 5A, 5B and 5C, the neighboring first electrode patterns 141 are formed on a portion of the substrate 100, the extension portions 120b, 120c, 121b, 121c, 123b and 123c of the first connection pattern 120, and the upper surface and side surfaces of the insulation pattern 130, but this invention is not limited thereto. For example, the neighboring first electrode patterns 141 may be formed on a portion of the substrate 100 and the extension portions 120b, 120c, 121b, 121c, 123b and 123c of the first connection pattern 120 excluding the upper surface and side surfaces of the insulation pattern 130. However, if the neighboring first electrode patterns 141 are also formed on the upper surface and side surfaces of the insulation pattern 130 as shown in FIGS. 5A to 5C, a process margin which corresponds to a length from the side surfaces to the upper surface of the first insulation pattern 130 can be secured. Accordingly, although misalignment exists at a process of patterning the first and second electrode patterns 141 and 151 and the second connection patterns 153, it is possible to appropriately assure electrical contact of the first electrode patterns 141 and the first connection pattern 120.

Figure 6:
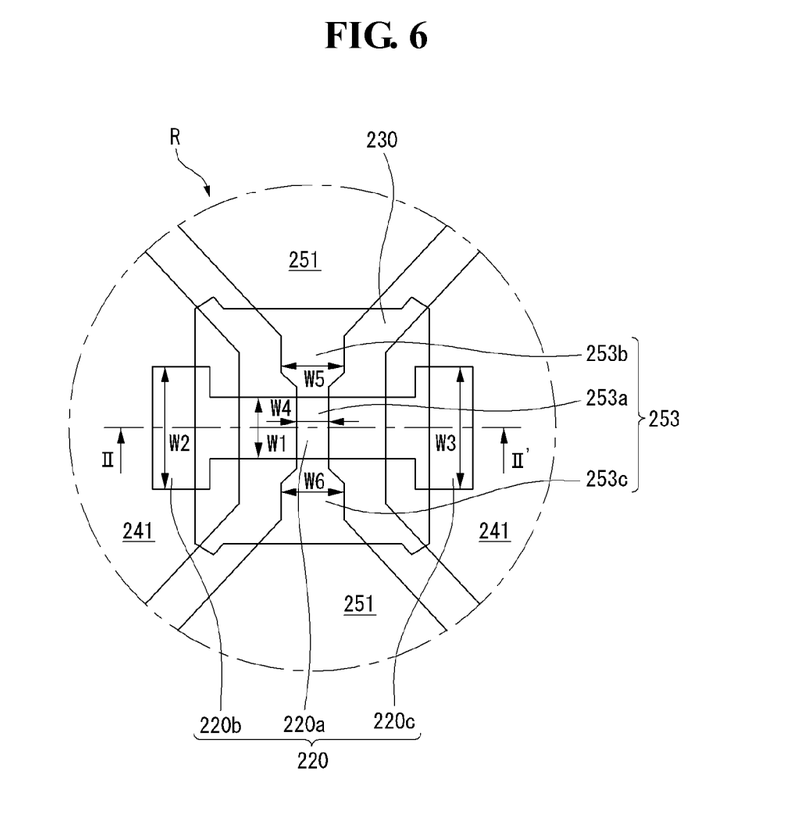
FIG. 6 is an enlarged plan view illustrating another example of R part of the touch screen panel shown in FIG. 3.

Hereinafter, a touch screen panel according to second exemplary embodiment of this invention will be described with reference to FIGS. 6 to 7C. FIG. 6 is an enlarged plan view illustrating another example of R part of the touch screen panel shown in FIG. 3, and FIGS. 7A to 7C are cross-sectional views illustrating examples of the touch screen panel taken along line II-II' of FIG. 6.

The touch screen panel of the second embodiment shown in FIG. 6 is similar to the touch screen panel the first embodiment shown FIG. 4 excepting that a width W4 of the second connection pattern 253 overlapped with the first connection pattern 220 is different from a width W5 or W6 of the second connection pattern 153 non-overlapped with the first connection pattern 120.

Referring to FIG. 6, the first connection pattern 220 has a middle portion 220a partially overlapped with the second connection pattern 253 and first and second extension portions 220b and 220c to connect neighboring first electrode patterns 241 to each other. The first extension portion 220b extends from the middle portion 220a to a left direction of FIG. 6, and has a width W2 larger than a width W1 of the middle portion 220a at an overlap area of the first electrode pattern 241 and the first connection pattern 220. The second extension portion 220c extends from the middle portion 220a to a right direction of FIG. 6, and has a width W3 larger than the width W1 of the middle portion 220a at an overlap area of the first electrode pattern 241 and the first connection pattern 220. FIG. 6 shows that the first and second extension portion 220b and 220c has rectangular shape, but this invention is not limited thereto. The construction in which the first and second extension portions 220b and 220c of the first connection pattern 220 have the widths W2 and W3 larger than the width W1 of the middle portion 220a belongs to scope of this invention.

FIG. 6 shows that the insulation pattern 230 overlaps with the a portion of the first electrode pattern 241, a portion of the first connection pattern 220, a portion of the second electrode pattern 251 and the second connection pattern 253, but this invention is not limited thereto. For example, it is possible that the insulation pattern 230 is formed at only cross area of the first connection pattern 220 and the second connection pattern 253 so that the first connection pattern 220 is not contacted with the second electrode pattern 253.

The second connection pattern 253 connecting the neighboring second electrode patterns 251 to each other has a first portion 253b and a second portion 253c extended from the neighboring second electrode patterns 251 respectively, and a third portion 253a between the first portion 253b and the second portion 253c. The third portion 253a of the second pattern 253 has a width W4 smaller than a width W5 or W6 of each the first portion 253b and the second portion 253c. As thus, because the third portion 253a of the second connection pattern 253 is connection electrode pattern 253a is narrow at area in which the first connection pattern 220 is overlapped with the second connection pattern 253, it is possible to reduce electrostatic capacity formed between the first connection pattern 220 and the second connection pattern 253.

Figure 7A:
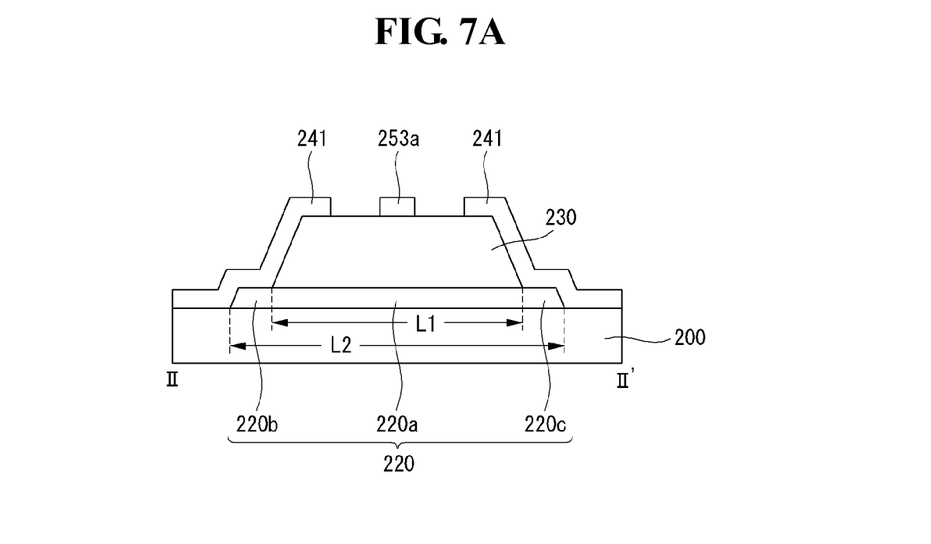
FIGS. 7A to 7C are cross-sectional views illustrating examples of the touch screen panel taken along line II-II' of FIG. 6.
Figure 7B:
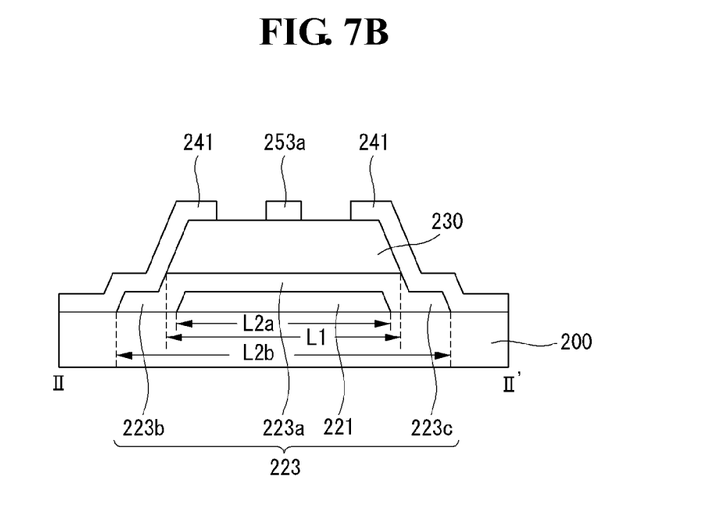
Figure 7C:
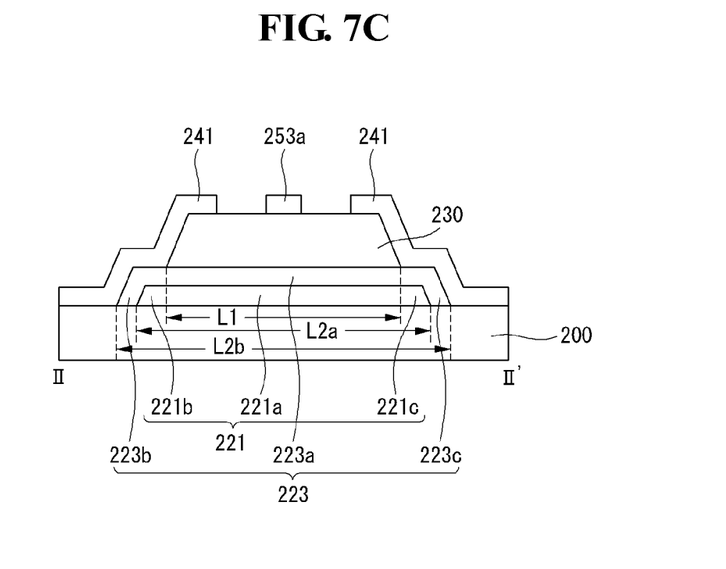

FIGS. 7A to 7C are cross-sectional views illustrating examples of the touch screen panel taken along line II-II' of FIG. 6. FIG. 7A shows an example that the first connection pattern 220 is formed in a single layer, FIGS. 7B and 7C show another examples that the first connection 220 are formed in double layers having a lower layer 221 and an upper layer 223. FIG. 7B is different from FIG. 7C that the lower layer 221 is not exposed outside of the insulation pattern 230 in FIG. 7B but the lower layer 221 is exposed outside of the insulation pattern 230 in FIG. 7C.

Referring FIG. 7A, the first connection pattern 220 is formed on the substrate 200, and the insulation pattern 230 having a length L1 smaller than a length L2 of the first connection pattern 220 is formed on the first connection pattern 220. Also, the first electrode pattern 241 is formed on a portion of the substrate 200, a portion of the first and second extension portions 220b and 220c of the first connection pattern 220 to be exposed outside of the insulation pattern 230, and an upper surface and side surfaces of insulation pattern 230. The second connection pattern 253 is formed on the insulation pattern 230 between the first electrode patterns 241 so that the second connection pattern 253 is not contacted with the first electrode patterns 241.

In the example of FIG. 7A, the first connection pattern 220 is formed of a transparent conductive material such as indium tin oxide (ITO), indium zinc oxide (IZO) and Gallium-doped Zinc Oxide (GZO), or a metal material such as Al, AlNd, Mo, MoTi, Cu, CuOx and Cr. The first and second electrode patterns 241 and 251 and the second connection pattern 253 are formed of a transparent conductive material such as ITO, IZO and GZO.

Referring FIG. 7B, the first connection pattern 220 consisting of a lower layer 221 and an upper layer 223 is formed on the substrate 200, and the insulation pattern 230 is formed on the upper layer 223 of the first connection pattern 220. A length L2a of the lower layer 221 of the first connection pattern 220 is not larger than a length L1 of the insulation layer 230, and a length L2b of the upper layer 223 of the first connection pattern 220 is larger than the length L1 of the insulation layer 230 to be exposed outside the insulation layer 230. Also, the first electrode pattern 241 is formed on a portion of the substrate 200, a first extension portion 223b or a second extension portion 223c of the upper layer 223 of the first connection pattern 220 exposed outside of the insulation pattern 230, and an upper surface and side surfaces of insulation pattern 230. The second connection pattern 253 is formed on the insulation pattern 230 between the first electrode patterns 241 so that the second connection pattern 253 is not contacted with the first electrode patterns 241.

In the example of FIG. 7B, the lower layer 221 of the first connection pattern 220 is formed of a transparent conductive material such as indium tin oxide (ITO), indium zinc oxide (IZO) and Gallium-doped Zinc Oxide (GZO), or a metal material such as Al, AlNd, Mo, MoTi, Cu, CuOx and Cr. The upper layer 223 of the first connection pattern 220 is formed of the above-mentioned metal material when the lower pattern 221 is formed of the transparent conductive material, and formed of the above-mentioned transparent conductive material when the lower pattern 221 is formed of the above-mentioned metal material. The first and second electrode patterns 241 and 251 and the second connection pattern 253 are formed of a transparent conductive material such as ITO, IZO and GZO.

Referring FIG. 7C, the first connection pattern 220 consisting of a lower layer 221 and an upper layer 223 is formed on the substrate 200, and the insulation pattern 230 is formed on the upper layer 223 of the first connection pattern 220. Lengths L2a and L2b of the lower and upper layers 221 and 223 of the first connection pattern 220 are larger than the length L1 of the insulation layer 230 to be exposed outside the insulation layer 230. Also, the first electrode pattern 241 is formed on a portion of the substrate 200, a first extension portion 223b or a second extension portion 223c of the upper layer 223 of the first connection pattern 220 exposed outside of the insulation pattern 230, and an upper surface and side surfaces of insulation pattern 230. The second connection pattern 253 is formed on the insulation pattern 230 between the first electrode patterns 241 so that the second connection pattern 253 is not contacted with the first electrode patterns 241.

In the example of FIG. 7C, the lower layer 221 of the first connection pattern 220 is formed of a transparent conductive material such as indium tin oxide (ITO), indium zinc oxide (IZO) and Gallium-doped Zinc Oxide (GZO), or a metal material such as Al, AlNd, Mo, MoTi, Cu, CuOx and Cr. The upper layer 223 of the first connection pattern 220 is formed of the above-mentioned metal material when the lower pattern 221 is formed of the transparent conductive material, and formed of the above-mentioned transparent conductive material when the lower pattern 221 is formed of the above-mentioned metal material. The first and second electrode patterns 241 and 251 and the second connection pattern 253 are formed of a transparent conductive material such as ITO, IZO and GZO.

In the examples of FIGS. 7A, 7B and 7C, the neighboring first electrode patterns 241 are formed on a portion of the substrate 200, the extension portions 220b, 220c, 221b, 221c, 223b and 223c of the first connection pattern 220, and the upper surface and side surfaces of the insulation pattern 230, but this invention is not limited thereto. For example, the neighboring first electrode patterns 241 may be formed on a portion of the substrate 200 and the extension portions 220b, 220c, 221b, 221c, 223b and 223c of the first connection pattern 220 excluding the upper surface and side surfaces of the insulation pattern 230. However, if the neighboring first electrode patterns 241 are also formed on the upper surface and side surfaces of the insulation pattern 230 as shown in FIGS. 7A to 7C, a process margin which corresponds to a length from the side surfaces to the upper surface of the first insulation pattern 230 can be secured. Accordingly, although misalignment exists at a process of patterning the first and second electrode patterns 241 and 251 and the second connection patterns 253, it is possible to appropriately assure electrical contact of the first electrode patterns 241 and the first connection pattern 220.

As mentioned above, the contact resistance of the first connection pattern and the first electrode pattern decreases because the touch screen panels according to the embodiments of this invention has a construction that the width W2 and/or W3 of the first connection pattern in the contact area of the first connection pattern and the first electrode pattern is larger than the width W1 of the first connection pattern in the overlap area of the first connection pattern and the second electrode pattern. Accordingly, although a high current caused by static electricity flows through the connection pattern via the first electrode pattern, it is possible to prevent the first connection pattern from being damaged because the contact resistance of the first connection pattern and the first electrode pattern decreases.

Also, it is possible to decrease electrostatic capacity created by overlap of the first connection pattern and the second connection pattern because the touch screen panels according to the second exemplary embodiment of this invention has a construction that the width W4 of the second connection pattern is narrow at area in which the first connection pattern is overlapped with the second electrode pattern.

Table 1 shows measure results of resistances and electrostatic capacitances of the first and second connection patterns of the touch screen panel according to the embodiments of this invention and the related art touch screen panel. In the embodiments of this invention, the width W2 and/or W3 of the first connection pattern in the contact area of the first connection pattern 120 and 220 and the first electrode pattern 141 and 241 is larger than the width W1 of the first connection pattern in an overlap area of the first connection pattern 120 and 220 and the second connection pattern 153 and 253. Also, the width W4 of the second connection pattern at the overlap area in which the first connection pattern is overlapped with the second connection pattern is smaller than the width W5 and/or W6 of the non-overlap area in which the first connection pattern is not overlapped with the second connection pattern.

TABLE 1

|  | first connection pattern | | second connection pattern | |
| --- | --- | --- | --- | --- |
|  | Resistance (kΩ) | electrostatic capacitance (pF) | resistance (kΩ) | electrostatic capacitance (pF) |
| Related art | 10.5 | 90 | 7 | 48 |
| This invention | 11.0 | 86 | 8 | 45 |

As known from table 1, resistances of the first connection pattern and the second connection pattern increases, but electrostatic capacitance the first connection pattern and the second connection pattern decreases. Nevertheless, it is possible to enhance performance of the touch screen panel because the performance of the touch screen panel is more affected from the electrostatic capacitance component than the resistance component.

The touch screen panels according to the embodiments of this invention may be applied to display devices such as a liquid crystal display, a field emission display, a plasma display panel, an electroluminescence device, an electrophoresis display and a flexible display. In these cases, the substrates of the touch screen panels may be also used as substrates of the display devices.

Although example embodiments have been described with reference to a number of illustrative examples, it should be understood that numerous other modifications and changes can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen panel, comprising:
a substrate;
a plurality of first electrode serials arranged in a first direction on the substrate, each of the plurality of first electrode serials including a plurality of first electrode patterns;
a plurality of second electrode serials arranged in a second direction on the substrate and crossing over the plurality of first electrode serials;
a plurality of insulation patterns formed between the plurality of first electrode serials and the plurality of second electrode serials at regions in which the plurality of first electrode serials crosses over the plurality of second electrode serials so that the plurality of first electrode serials are insulated from the plurality of second electrode serials; and
a plurality of first connection patterns formed on the substrate to connect neighboring first electrode patterns to each other,
wherein each of the plurality of first connection patterns includes a first portion overlapped with the plurality of second electrode serials, a second portion extended from one end of the first portion and overlapped with one of the neighboring first electrode patterns, and a third portion extended from another end of the first portion and overlapped with another of the neighboring first electrode patterns,
wherein a width of at least one portion of the second and third portions of the first connection pattern is larger than that of the first portion in areas where the second and third portions are overlapped with the neighboring first electrode patterns, and
wherein each of the plurality of first connection patterns includes one or two layers, if the first connection pattern includes the one layer, the one layer is formed of a transparent conductive material, and if the first connection pattern includes two layers, an upper layer of the two layers is formed of a transparent conductive material and a lower layer of the two layers is formed of a metal material.

2. The touch screen panel according to claim 1, wherein each of the plurality of second electrode serials includes a plurality of second electrode patterns and second connection patterns for connecting neighboring second electrode patterns, wherein each of the second connection patterns is integrally formed with the second electrode patterns.

3. The touch screen panel according to claim 2, wherein the first and second electrode patterns and the second connection pattern are formed of a transparent conductive material.

4. The touch screen panel according to claim 3, wherein transparent conductive material includes one of indium tin oxide (ITO), indium zinc oxide (IZO) and Gallium-doped Zinc Oxide (GZO), and the metal material includes one of Al, AlNd, Mo, MoTi, Cu, CuOx and Cr.

5. The touch screen panel according to claim 2, wherein the width of the second connection pattern at the overlap area in which the first connection pattern is overlapped with the second connection pattern is smaller than that of the non-overlap area in which the first connection pattern is not overlapped with the second connection pattern.

6. The touch screen panel according to claim 1, wherein the transparent conductive material includes one of indium tin oxide (ITO), indium zinc oxide (IZO) and Gallium-doped Zinc Oxide (GZO), and the metal material includes one of Al, AlNd, Mo, MoTi, Cu, CuOx and Cr.

7. The touch screen panel according to claim 1, wherein a width of the lower layer of the first connection pattern is not larger than that of the insulation pattern, and a width of the upper layer of the first connection pattern is larger than that of the insulation pattern so that the upper layer of the first connection pattern is exposed outside the insulation pattern.

8. The touch screen panel according to claim 1, wherein widths of the lower and upper layers of the first connection pattern are larger than that of the insulation pattern so that the lower and upper layers of the first connection pattern are exposed outside the insulation pattern.

9. The touch screen panel according to claim 1, wherein the first electrode pattern is formed on a portion of the second and third portions of the first connection pattern exposed outside of the insulation pattern, and an upper surface and side surfaces of insulation pattern.

* * * * *